May 2, 1961 R. M. DILLE 2,982,635

CARBON SEPARATION PROCESS

Filed Dec. 30, 1958

United States Patent Office 2,982,635
Patented May 2, 1961

1

2,982,635

CARBON SEPARATION PROCESS

Roger M. Dille, Whittier, Calif., assignor to Texaco Inc., a corporation of Delaware Filed Dec. 30, 1958, Ser. No. 783,776

19 Claims. (Cl. 48—196)

This invention relates to a process for the production of synthesis gas from carbonaceous fuels. More specifically, the invention is concerned with improvements in a method for the separation and recovery of free carbon particles from a carbon-water slurry formed in a synthesis gas generation process.

It is known that in the production of synthesis gas by the partial oxidation of a solid hydrocarbonaceous material there is obtained as a by-product a certain amount of finely-divided carbon in the resulting product gases, carbon monoxide and hydrogen. It is also known that the presence of these solid carbon by-products in the gaseous products obtained from a synthesis gas generator interfere with the main reactions in subsequent processes for conversion of the synthesis gas products into hydrocarbons, ammonia, and oxygenated hydrocarbons, for example, in Fischer-Tropsch type synthesis, ammonia synthesis, or methanol synthesis.

Many methods have been proposed to effect separation of the free carbon particles from the synthesis gas products. These known carbon separation methods in general comprise treatment of the effluent products from the synthesis gas generator with water or water containing a low molecular weight oxygenated hydrocarbon in a scrubbing tower to effect removal of the entrained carbon particles therefrom and the removed carbon particles are then withdrawn from the scrubbing zone in the form of a carbon-water slurry. In general the carbon content of the slurry varies from about 0.1% to about 3% by weight dependent on the generator feed stocks and reaction conditions in the generator.

The carbon particles are thereafter separated from the carbon-water slurry in a conventional manner such as by filtration or by evaporation. Filtration is generally carried out using a rotary filter operated at subatmospheric pressure that is from about 5 to 10 p.s.i.a. When the carbon is separated from the slurry by a filtration operation the resulting water filtrate is commonly recycled to the scrubbing tower for reuse as scrubbing liquid by suitable piping, pumps, and the like.

A vacuum filtration type operation has many known disadvantages such as the cost of equipment, materials, handling facilities and the like. One of the known disadvantages is that the carbon particles separated from the aqueous slurry are not suited for immediate use as fuel feed stock or in carbon black manufacture because of the high water content of such particles. The recovered carbon particles in the form of filter cakes contain about 80 to about 90 weight percent water, the balance carbon. In order to utilize the carbon particles recovered from a filtration operation in an efficient and economical manner it is generally necessary to decrease the water content of the filter cake somewhat, particularly when the carbon is to be used as a fuel feed stock. One known method of decreasing the water content of the carbon filter cake is by an evaporation operation but this method is not completely satisfactory in large scale industrial operations due to the considerable amount of heat required and also the equipment needed for such an operation. Solvent extraction has been employed heretofore in the separation of undesirable liquids including water from materials but such methods likewise have certain objectionable features such as solvent-handling and solvent loss which make them unattractive to industry.

2

It is also known that the carbon particles dispersed in the carbon water slurry can be recovered therefrom by permitting the slurry to remain in the quiescent state for a considerable period of time, that is, approximately about 2 or more days, depending on the concentration of the carbon in the slurry. On standing, the carbon particles gradually collect in the lower portion of the settling tank and they are recovered therefrom after withdrawal of the water layer such as by decantation. The recovered carbon particles contain considerable amounts of water. This method of recovering the carbon particles is objectionable because of the need to provide large areas for settling tanks, ponds, etc., the length of time required for settling of the carbon and the relatively inefficient separation of the settled carbon particles from the aqueous liquid.

We have now surprisingly found that these disadvantages can be overcome or substantially decreased by the hereinafter described process of the present invention which obviates the need for separating the carbon particles from the slurry by filtration. In addition the water content of the recovered free carbon particles is materially reduced by the process of the invention.

The present invention comprises contacting the carbon water slurry obtained in a synthesis gas generation process with a water-insoluble long carbon chain fatty acid or a glyceride thereof and thereafter recovering the separated carbon particles from the slurry.

Contacting the aqueous carbon slurry with the fatty acid or a glyceride thereof causes the carbon particles to collect in the upper portion of the aqueous liquid. The resulting separated carbon particles can be recovered from the upper layer by conventional flotation separation methods.

One method of recovering the separated carbon particles from the contacted slurry is by first drawing off the aqueous liquid at a low portion of the separation vessel then collecting the separated carbon particles from a lower portion of the separator in a known manner. It is preferred however, to effect recovery of the separated carbon particles from the contacted slurry by a skimming operation using a rotating rake.

While not intending to be bound by any precise theory as to the manner in which the fatty acid or its glyceride functions in the process of the invention it is apparent that the water absorbed or adsorbed by the dispersed carbon particles of the aqueous slurry is displaced therefrom by the fatty acid or the fatty acid glyceride. The displacement of the sorbed water from the dispersed carbon particles by the fatty acid or its glyceride reduces their apparent specific gravity below the specific gravity of the liquid and enables the dispersed carbon particles to collect at or near the surface of the aqueous liquid.

When reference is made to the "carbon-water slurry" throughout the specification and claims it is to be understood that what is meant is a carbon water slurry that has been formed in a synthesis gas generation process wherein a hydrocarbonaceous material is subjected to partial oxidation at an elevated temperature and pressure; the resulting mixture of product gases comprising carbon monoxide and hydrogen containing dispersed therein free carbon particles is passed to a scrubbing zone and therein intimately and countercurrently contacted with an aqueous liquid to effect separation of said free carbonaceous particles from the synthesis gaseous products and formation of an aqueous dispersion or slurry of said free carbon particles; and the resulting aqueous slurry of carbon particles is withdrawn from the aforesaid scrubbing zone.

Fatty acids suitable for use in the process of the present invention include water-insoluble long chain saturated and unsaturated fatty acids such as the $C_{12}$ to $C_{20}$ fatty acids including lauric, myristic, pentadecanoic, palmitic, margaric, stearic, oleic, elaidic, linoleic and linolenic acids.

Mixtures of these fatty acids as well as the fatty acid glycerides such as those present in rapeseed, peanut, coconut, soybean, corn oils and the like can also be used in the process of the present invention. By water-insoluble fatty acid is meant one which is soluble in water not more than about 0.03 gram when measured in 100 parts of water at 25° C.

The quantity of fatty acid or glyceride thereof required to effect separation of the carbon particles from the aqueous water slurry is based on the oil absorption value of the carbon.

Oil absorption value is a criterion of the amount of oil necessary to wet a particular sample of carbon. The oil absorption value is determined by adding increments of alkali-refined linseed oil to a 1.0 gram sample of dry carbon and mixing with a spatula until a single coherent ball of paste is formed which does not tend to break down after forming. The procedure for this test is described in detail in ASTM D281–31. The oil absorption value is expressed as cubic centimeters per gram or as gallons per hundred pounds by applying a factor of 12.

The oil absorption value of carbon produced in a synthesis gas generation process generally varies between about 2 to 4 cubic centimeters per gram of carbon.

In general I have found that it is necessary to use the fatty acid or a glyceride thereof in an amount of at least about ½ the oil absorption value of the carbon in the slurry in order to effect separation of the carbon particles. It is preferred, however, to employ the fatty acid in an amount about equal to the oil absorption number of the carbon for rapid separation of the carbon particles from the aqueous carbon slurry.

The addition of the fatty acid to the carbon water slurry in an amount substantially below about one-half the oil absorption value is ineffective for separation of the carbon particles from the slurry by flotation. However, it has been discovered that the addition of the fatty acid does result in the displacement of some of the water which has been sorbed by the carbon particles in the slurry and therefore is effective in reducing the water content of the carbon particles.

Satisfactory results are obtained when the fatty acid is used in an amount of from about 100% to about 3000% by weight based on the amount of free carbon particles present in the slurry and based on the particular oil absorption value of the dry carbon. Most satisfactory results are secured when the fatty acid is present in the slurry in an amount ranging from 150% to about 900%, by weight, basis weight of carbon present. A range of 200% to 500% is especially preferred for carbon having an oil absorption value of from about 2 to 3 cubic centimeters per gram. The use of small amounts of these water-insoluble fatty acids or their glycerides such as from about 1% to about 5% by weight, basis carbon in slurry, are not effective in separating the carbon from the carbon water slurry.

When large amounts of the fatty acid are used for example quantities in excess of about 500 weight percent, basis carbon present and its particular oil absorption value, then the resulting separated carbon particles are found dispersed in a layer of the oleic acid which is floating on or near the top of the aqueous liquid. The oleic acid layer containing the suspended carbon particles can be withdrawn from the aqueous liquid by decantation or by a skimming operation.

The addition of a water-soluble calcium- or a magnesium-compound to the carbon water slurry together with the fatty acid additive facilitates separation of the carbon particles from the slurry due to the formation of a calcium or magnesium soap which is absorbed by the carbon. In the case where a calcium compound is used, the carbon rises to the top of the water in the form of curds. The use of a magnesium compound results in the formation of a carbon button which also rises to the top of the water. Compounds suitable for use in the invention include the oxide, hydroxide or chloride of calcium or magnesium.

In carrying out the process of the invention it is desirable to provide a carbon concentration in the carbon-water slurry of from about 0.1 to about 3 percent by weight. It is preferred that the slurry contains the dispersed carbon particles in an amount of from about 0.4% to about 1.5% by weight for the most satisfactory results, with a range of from about 0.5 to about 1% of carbon, by weight, being particularly preferred for optimum results.

For the purpose of more fully describing the novel features of the invention and to provide for a better understanding of same reference is had to the accompanying drawings in which.

Figures 1, 2:
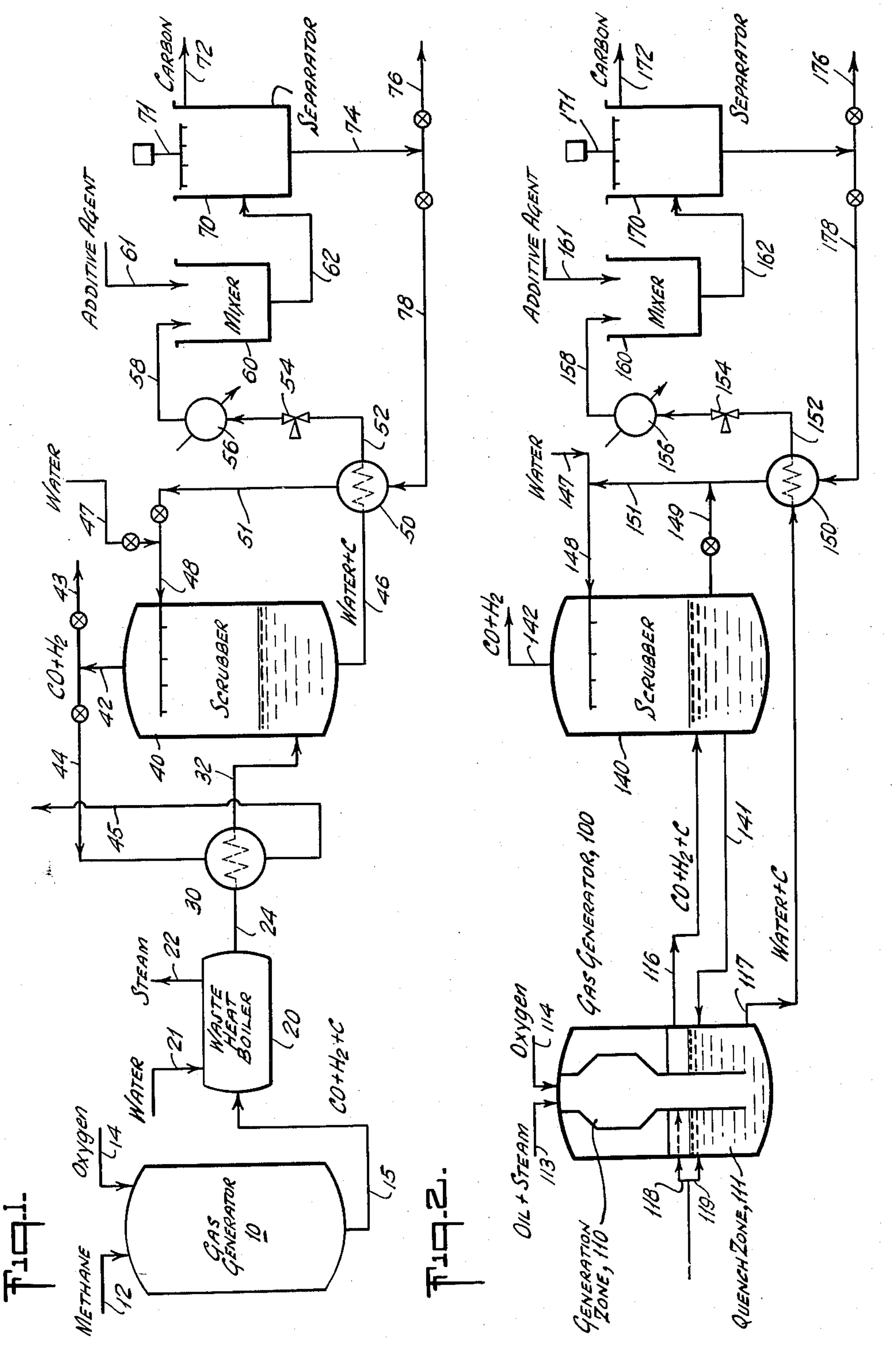
Fig. 1 is a diagrammatic illustration of one embodiment of the process of the present invention.
Fig. 2 is a diagrammatic view of another and preferred embodiment of the present invention.

Various conventional pieces of equipment such as pumps, valves etc. which are readily apparent to those skilled in the art have been omitted from the drawings for the sake of clarity.

Referring now to the drawings in detail and to Fig. 1 in particular, in the reaction zone of a synthesis gas generator 10 a mixture of methane and oxygen introduced therein by feed lines 12 and 14, respectively, is subjected to controlled partial combustion at elevated temperatures and superatmospheric pressures whereby hot gaseous products of partial combustion including carbon monoxide, hydrogen, and free carbon particles are produced.

The generator effluent comprising the hot gaseous combustion products CO and $H_2$ and the free carbon particles is withdrawn through line 15 from the generator 10 and passed to a waste heat boiler 20 whereby the generator effluent is cooled to a temperature not substantially above 800° F., and preferably not below about 450° F. A cooling liquid such as water is passed through line 21 to boiler 20 and by-product steam is withdrawn therefrom by line 22 for utilization as a source of heat in the system. The resulting partially cooled generator effluent is then fed through line 24, through indirect heat exchanger 30 where further cooling is effected, then passed through line 32 to a scrubbing tower 40 wherein the free carbon particles (in the generator effluent) are separated from the generator effluent gases. Carbon separation is accomplished in the tower 40 by countercurrent contacting of the generator effluent gases with an aqueous scrubbing liquid that is introduced into the upper portion of scrubber 40 through line 48. Scrubbing liquid is fed through line 47 to feed line 48 from a water source not shown. Optionally, make-up fresh water can be passed through lines 47 and 48 and mixed in line 48 with water recovered at a subsequent point in the process, that is from separator 70; said recovered water being passed to line 48 through feed lines 74 and 78, through a heat exchanger 50 and feed line 51. The scrubbed effluent synthesis gases are removed from scrubber 40 by way of line 42 and passed through line 43 to storage facilities not shown or to a synthesis gas reaction zone for example, an oxide ore reduction zone or a hydrocarbon synthesis zone. If desired, the scrubber synthesis gases can be passed from scrubber 40 through line 42, line 44 and through heat exchanger 30 to serve as the cooling agent therefor before being passed through line 45 to storage facilities or to a synthesis gas reaction zone.

The aqueous wash liquid or slurry containing the carbon particles removed from the generator gas products is withdrawn from scrubber 40 through line 46 and passed through a heat exchanger 50 to reduce the temperature of the slurry to about 150° F., then passed through line 52 through pressure-reducing valve 54, whereby the pressure on the slurry is decreased to substantially atmospheric pressure, then passed to cooling zone 56 to further cool the slurry to a temperature within the range of from about 70° F. to 115° F. The cooled slurry is then passed through line 58 to a mixing tank 60 wherein the carbon-water slurry is blended with the water-insoluble fatty acid or a glyceride of the fatty acid thereof introduced into vessel 60 through line 61. If desired, vessel 60 can be provided with suitable mechanical mixing means, not shown, to assist in the mixing of the slurry and the fatty acid. The resulting aqueous mixture is withdrawn through line 62 from vessel 60 and passed to a separation zone 70 wherein the resulting separated carbon particles are recovered by skimming the carbon from the water. The recovered carbon is withdrawn through line 72 from separation zone 70. Separation zone 70 can be provided with a suitable skimming device such as a rotating rake 71 to assist in recovering the floating free carbon particles.

The substantially carbon-free and fatty acid-free aqueous liquid is withdrawn from separation zone 70 through line 74 and may be recycled through line 78 to heat exchanger 50, serving as the cooling agent therefor, then passed through line 51 to scrubbing water feed line 43. Optionally, the aqueous liquid can be withdrawn from separator 70 through line 74 and at least a portion thereof discarded through line 76.

In a second modification of the invention, and with reference to Fig. 2 of the drawings, a preheated mixture of steam and hydrocarbon oil from feed line 113 is reacted with oxygen from feed line 114 in a generation zone 110 which is internally disposed in the upper portion of a gas generator 100. The hot reaction products including by-product free carbon particles are passed to quench zone 111 located in the lower portion of vessel 100 and therein are contacted with a quench water stream introduced into the quench zone 111 through lines 118 and 119, respectively. Desirably, a pool of water is maintained in quench zone 111 to aid in rapid cooling of the generation zone effluent. In quench zone 111, the hot products of combustion are partially cooled by the water introduced therein by feed lines 118 and 119, as well as the pool of water and at least partial separation of carbon particles from the product gases is effected in the quench zone by entrainment with water.

The partially cooled gaseous reaction products including at least part of the by-product free carbon particles are withdrawn from quench zone 111 through line 116 and passed therethrough to a scrubbing zone 140 for further removal of the free carbon particles from the main gaseous products of the generation zone by the scrubbing action of an aqueous wash liquid introduced into tower 140 through feed line 148. The aqueous wash liquid, obtained from an external source not shown, is fed to scrubber 140 through line 147 and line 148. A portion of the wash liquid in line 148 can also be obtained from the water recovered at a subsequent point in the process, the recovered water being obtained from separator 170 and passed to line 148 through lines 174, 178, heat exchanger 150 and feed line 151.

The scrubbed gases substantially free of carbon particles are removed from the scrubber 140 by way of line 142 for further processing. The pool of scrubbing liquid accumulated in the lower portion of scrubber 140 containing the carbon particles scrubbed from the generation zone product gases may be recycled through line 149 and line 151 to the feed line 148 at the upper portion of scrubber 140 when it is desired to increase the concentration of the carbon particles in the wash liquid before final withdrawal of the carbon-water slurry from scrubber 140. The scrubbing water accumulated in the lower portion of the tower and containing the carbon particles removed from the gas stream in scrubber 140 is passed through line 141 to quench zone 111 to effect cooling of the generator effluent introduced into the quench zone and also to remove at least a part of the carbon particles from the fresh synthesis gas products being introduced into zone 111 from generation zone 110. The resulting concentrated slurry of carbon in water is passed through line 117 from quench zone 111 to heat exchanger 150 to effect a reduction of the temperature of the carbon-water slurry to about 120° to 200° F., preferably about 150° F. then passed through line 152 through pressure-reducing valve 154 whereby the pressure of the slurry is decreased to about atmospheric pressure, and then passed to a cooling zone 156 to further reduce the temperature of the slurry to a temperature between about 70° F. to 125° F. The resulting cooled slurry is then passed through line 158 to a mixing vessel or tank 160 wherein the slurry is intimately mixed with a water-insoluble fatty acid or fatty acid glyceride as hereinabove defined fed to vessel 160 through line 161. The resulting mixture is then passed by way of line 162 to a separation zone 170 which is provided with a rotating rake 171 to assist in skimming the floating carbon particles from the top of the slurry. The separated carbon particles are then withdrawn from the separation zone through line 172.

The water is withdrawn from the separator 170 by way of line 174 and then may be discarded by passage through line 176. A portion or all of the water in line 174 may be fed through line 178 to heat exchanger 150 to serve as the cooling agent therefor, then passed by way of line 151 to feed line 148 which supplies scrubbing liquid to scrubbing tower 140.

The following examples illustrate the procedural steps of the invention.

EXAMPLE 1

A carbon water slurry containing 1% by weight of by-product carbon particles (oil absorption values of about 3 cc./gram of carbon) produced in a synthesis gas generation process was blended in a glass vessel with 47.4% by weight of oleic acid basis carbon. The resulting mixture was mechanically agitated briefly to ensure thorough mixing of the components; then the mixer was stopped. No separation of the carbon particles occurred.

EXAMPLE 2

Following the procedure of Example 1, an additional run was made with the aqueous carbon slurry used in Example 1, to which 94.8% by weight of oleic acid, basis carbon present had been added. On mixing and permitting the mixture to stand, no separation of the carbon particles was observed.

EXAMPLE 3

Following the procedure of Example 1, and using the same carbon water slurry, an additional run was made wherein 142.2% by weight of oleic acid, basis carbon, was blended with the slurry. On standing the resulting separated carbon particles rose to the top of the vessel. The floating separated carbon particles containing 37% by weight of absorbed water were withdrawn from the substantially carbon free aqueous liquid by a skimming operation.

EXAMPLE 4

Following the procedure of Example 3, an additional run is made wherein 300% of oleic acid, basis carbon is blended with the carbon water slurry. The resulting separated carbon particles which are water-free are withdrawn from the top of the blended mixture in the manner set forth in Example 3.

EXAMPLE 5

A carbon water slurry containing 0.5% by weight of carbon particles having the same oil absorption value as shown in Example 1, obtained in a synthesis gas generation process is mechanically blended with 537% by weight of oleic acid, basis carbon present in the slurry. On standing the resulting separated carbon particles are found in the oleic acid layer floating on top of the substantially carbon free aqueous liquid. The separated carbon particles and oleic acid layer are removed from the substantially carbon free aqueous liquid by decantation of the separated carbon particles and the oleic acid layer, from the resulting clear aqueous liquid.

The following comparative run was made without the addition of a fatty acid to the slurry.

CONTROL EXAMPLE A

An aqueous carbon slurry containing 1% by weight of carbon particles produced in a synthesis gas generation process was subjected to mechanical mixing. The stirred mixture was then permitted to stand and thereafter a representative sample of the carbon particles which had settled to the bottom of the vessel was obtained. The water content of the sample amounted to about 97%.

The table below summarizes the data presented in Examples 1 to 4 and the control example.

*Table*

| Example | Carbon in slurry, wt. percent | Oleic Acid in slurry, wt. percent basis carbon | Water content of recovered carbon, wt. percent |
|---|---|---|---|
| 1 | 1.0 | 47.4 | No carbon recovered. |
| 2 | 1.0 | 94.8 | Do. |
| 3 | 1.0 | 142.2 | 37. |
| 4 | 1.0 | 300 | 0. |
| Control A | 1.0 | none | 97. |

The data presented in the foregoing table clearly show the beneficial effect obtained with regard to reduction in water content of the recovered carbon particles from the slurry containing oleic acid. The data show that the water content of the separated carbon particles recovered from a carbon-water slurry containing from about 150% to about 300% by weight of the fatty acid, basis carbon is materially lower than the water content of carbon particles recovered from a slurry to which no fatty acid or a glyceride thereof had been added.

EXAMPLE 6

Calcium hydroxide is added to an aqueous carbon slurry obtained in a synthesis gas generation process containing 1% by weight of carbon and 260% by weight of oleic acid, basis carbon. The resulting separated carbon particles in the form of curds rise to the top of the mixing vessel.

Obviously, many modifications and variations of the process of the invention can be made without departing from the spirit and scope thereof and therefore only such limitations should be imposed as are expressly indicated in the foregoing description and appended claims.

I claim:

1. In a process for the generation of a synthesis gas mixture by partial oxidation of a hydrocarbonaceous material at an elevated temperature and pressure in which the generated gas mixture comprising carbon monoxide and hydrogen contains minor amounts of solid carbon particles produced by said partial oxidation process, and the generated gas mixture is contacted in a gas scrubbing zone with an aqueous liquid to effect removal of said carbon particles from the mixture with the resulting formation of an aqueous slurry of said carbon particles, the improvement which comprises incorporating in the aqueous slurry a member selected from the group consisting of a water-insoluble long carbon chain fatty acid and a glyceride of the fatty acid in an amount of at least about one half the oil absorption value of the carbon and thereafter recovering in a separation zone the resulting separated carbon particles of reduced water content from the contacted slurry.

2. Process as claimed in claim 1, in which recovery of the carbon particles from the aqueous carbon slurry containing the water-insoluble long chain fatty acid is carried out by skimming the resulting separated carbon particles from the substantially carbon free aqueous liquid.

3. Process as claimed in claim 1, in which the slurry contains from about 0.1% to about 1.5% by weight of carbon particles.

4. Process as claimed in claim 1, in which the slurry contains from about 0.5 to about 1.0 percent by weight of carbon particles.

5. Process as claimed in claim 1, in which the fatty acid is oleic acid.

6. Process as claimed in claim 1, in which the fatty acid is employed in an amount of from about 100 percent to about 900 percent, based on the weight of carbon particles present in the slurry.

7. Process as claimed in claim 1, in which oleic acid is employed in an amount of from about 200 percent to about 400 percent by weight, based on the weight of carbon present in the slurry.

8. Method of decreasing the water content of carbon particles separated from a carbon-water slurry obtained in a partial oxidation process for the conversion of a hydrocarbonaceous material into a synthesis gas mixture comprising carbon monoxide and hydrogen which also contains free carbon particles which are removed therefrom by scrubbing the gas mixture in a gas scrubbing zone with water with the resultant formation of said carbon-water slurry, said method comprising introducing into the slurry a member selected from the group consisting of a water-insoluble long chain fatty acid and a glyceride thereof in an amount of from about 100 percent to about 500 percent by weight, based on the weight of free carbon particles present in the slurry, and thereafter recovering by skimming the resulting separated carbon particles having a reduced water content from the upper portion of the slurry.

9. In a partial oxidation process for the production of synthesis gas from a hydrocarbonaceous material wherein the resulting synthesis gas mixture comprising carbon monoxide and hydrogen is scrubbed in a gas scrubbing zone with water to remove therefrom solid carbon particle by-products with the resultant formation of a carbon-water slurry, the improvement which comprises incorporating in said slurry a water-insoluble long chain fatty acid, said fatty acid being employed in an amount of from about 100 percent to about 400 percent by weight, based on weight of carbon present in the slurry, and subsequently skimming the resulting separated carbon particles having a reduced water content from the upper portion of the contacted slurry.

10. In a conversion process in which a carbonaceous material is partially oxidized in a reaction zone under superatmospheric pressure in the presence of oxygen and steam to produce a hot gaseous product containing free carbon particles and the hot gaseous product is contacted with water in a gas scrubbing zone to remove the carbon particles and form a carbon-water slurry, the improvement which comprises passing the carbon-water slurry through a first cooling zone wherein the temperature of the slurry is decreased, passing the resulting cooled slurry through a pressure-reducing zone wherein the pressure on the slurry is lowered, passing the resulting slurry through another cooling zone wherein the temperature of the slurry is further decreased, passing the resulting slurry to a mixing zone wherein a water-insoluble long chain fatty acid is blended with the slurry, said fatty acid being employed in an amount of at least about one half the oil absorption value of the carbon, and thereafter passing the blended mixture to a separation zone wherein the resulting separated carbon particles are recovered from the slurry by skimming the carbon particles having a reduced water content from the upper portion of said slurry.

11. In a process for the production of carbon monoxide from a carbonaceous fuel wherein said fuel is reacted with oxygen in a reaction zone under superatmospheric pressure and a high temperature to produce a hot gaseous product containing particles of free carbon and said gaseous product is contacted with water in a gas scrubbing zone to remove said carbon particles therefrom and form a dispersion of the carbon particles in water and said carbon particles are recovered therefrom, the improvement which comprises contacting the gaseous products of combustion with water containing a water-insoluble long chain fatty acid in an amount of at least about one half the oil absorption value of the carbon and thereafter recovering the carbon particles from said dispersion by decantation of the resulting separated carbon particles having a reduced water content from the substantially carbon free water.

12. Process of claim 11 in which prior to said decantation the dispersion is intimately commingled in a quench zone with an additional portion of the hot gaseous products from the reaction zone to effect concentration of the carbon particles in said dispersion, said concentrated dispersion is subjected to temperature reduction, the resulting cooled dispersion is subjected to pressure reduction to substantially atmospheric pressure, and thereafter the resulting dispersion is subjected to said decantation.

13. Process as claimed in claim 11 in which the fatty acid is oleic acid.

14. Process as claimed in claim 11 in which the fatty acid is employed in an amount of from about 500 percent to about 900 percent, by weight, based on the weight of carbon particles present in the dispersion.

15. Process as claimed in claim 11 in which oleic acid is employed in an amount of from about 300 percent to about 900 percent by weight, based on the weight of carbon present in the dispersion.

16. Process as claimed in claim 1 in which subsequent to the addition of the fatty acid a water soluble calcium compound is added to the carbon water slurry.

17. Process as claimed in claim 16 in which the calcium compound is calcium hydroxide.

18. Process as claimed in claim 1, in which subsequent to the addition of the fatty acid a water soluble magnesium compound is added to the carbon water slurry.

19. Process as claimed in claim 18 in which the magnesium compound is magnesium hydroxide.

References Cited in the file of this patent

UNITED STATES PATENTS

| | | |
|---|---|---|
| 1,889,429 | Wiegand | Nov. 29, 1932 |
| 2,317,139 | Frantz | Apr. 20, 1943 |
| 2,585,659 | Kilpatrick | Feb. 12, 1952 |
| 2,665,980 | Carkeek | Jan. 12, 1954 |
| 2,725,985 | Howard et al. | Dec. 6, 1955 |
| 2,746,564 | Williams | May 22, 1956 |
| 2,793,938 | Frank | May 28, 1957 |
| 2,894,603 | Vasan | July 14, 1959 |

OTHER REFERENCES

Bureau of Mines, "Report of Investigations 4306," pp. 1–4, 16 and 17, July 1948.